United States Patent [19]

Schoofs et al.

[11] Patent Number: 5,147,419
[45] Date of Patent: Sep. 15, 1992

[54] APPARATUS AND METHOD FOR AIR DRYING WITH REDUCED OXYGEN ENRICHMENT

[76] Inventors: Gregory R. Schoofs, 560 Riverside Dr., Apt. 10H, New York, N.Y. 10027; Richard J. Schoofs, 125 Tharp Dr., Moraga, Calif. 94556

[21] Appl. No.: 555,957

[22] Filed: Jul. 19, 1990

[51] Int. Cl.$^5$ ............................................... B01D 53/04
[52] U.S. Cl. ........................................... 55/33; 55/28; 55/75; 55/179; 55/208; 55/389
[58] Field of Search ...................................... 55/33-35, 55/75, 179, 208, 389, 28

[56] References Cited

U.S. PATENT DOCUMENTS

| | | | |
|---|---|---|---|
| 2,882,243 | 4/1959 | Milton | 55/75 X |
| 2,944,627 | 7/1960 | Skarstrom | 55/62 X |
| 3,691,251 | 9/1972 | Bauer | 55/33 X |
| 3,981,698 | 9/1976 | Leppard | 55/33 X |
| 3,982,912 | 9/1976 | Vatsurugi et al. | 55/35 |
| 4,273,621 | 6/1981 | Fornoff | 55/33 X |
| 4,373,935 | 2/1983 | Ausikaitis et al. | 55/33 |
| 4,405,343 | 9/1983 | Othmer | 55/33 X |
| 4,407,662 | 10/1983 | Ginder | 55/33 |
| 4,469,665 | 9/1984 | Pinto | 55/33 X |
| 4,487,614 | 12/1984 | Yon | 55/33 |
| 4,636,225 | 1/1987 | Klein et al. | 55/33 X |
| 4,663,052 | 5/1987 | Sherman et al. | 55/35 X |
| 4,726,818 | 2/1988 | Yeung et al. | 55/33 |
| 4,971,606 | 11/1990 | Sircar et al. | 55/33 X |

FOREIGN PATENT DOCUMENTS

| | | | |
|---|---|---|---|
| 0043996 | 1/1982 | European Pat. Off. | 55/33 |
| 0064267 | 11/1982 | European Pat. Off. | 55/35 |
| 0764707 | 9/1980 | U.S.S.R. | 55/33 |

OTHER PUBLICATIONS

D. W. Breck & J. V. Smith, "Molecular Sines", *Scientific American*, vol. 200, No. 1 (Jan. 1959), pp. 85-94.

J. M. Kuchta et al., "Flammability And Autoignition of Hydrocarbon Fuels Under Static And Dynamic Conditions", *U.S. Bur. Mines Rep. Invest.*, 5992 (1962).

M. G. Zabetakis et al., "Autoignition of Lubricants At Elevated Pressures", *U.S. Bur. Mines Rep. Invest.*, 6112 (1962).

F. T. Bodurtha, "Industrial Explosion Prevention and Protection", McGraw-Hill, New York (1980), pp. 25-29.

C. S. McCoy & F. J. Hanly, "Fire-Resistant Lubricants for Refinery Air Compressors", paper presented at the National Fuels and Lubricants Meeting of the National Petroleum Refiners Association, (Sep. 11-12, 1975), Houston, Tex.

*Primary Examiner*—Robert Spitzer
*Attorney, Agent, or Firm*—Townsend and Townsend

[57] ABSTRACT

Adsorbers used to dry air frequently contain 4A or 13X molecular sieve zeolites, which are intermittently reactivated by thermal regeneration, When a thermally regenerated adsorber is repressurized, nitrogen adsorbs preferentially relative to oxygen in activated 4A and 13X molecular sieve zeolites. This produces an oxygen-enriched, high pressure gas within the adsorber vessel which emerges immediately after the absorber is brought on line. The oxygen-enriched, high pressure gas can cause fires, explosions, and other deleterious effects in and downstream of such adsorber vessels. This invention provides thermally regenerated air driers, adsorbent chambers and air drying processes using adsorbent compositions that do not adsorb nitrogen preferantially to oxygen. Thermally regenerated air driers, adsorbers and drying processes using such adsorbent compositions prevent the problems associated with transient oxygen enrichment.

11 Claims, 4 Drawing Sheets

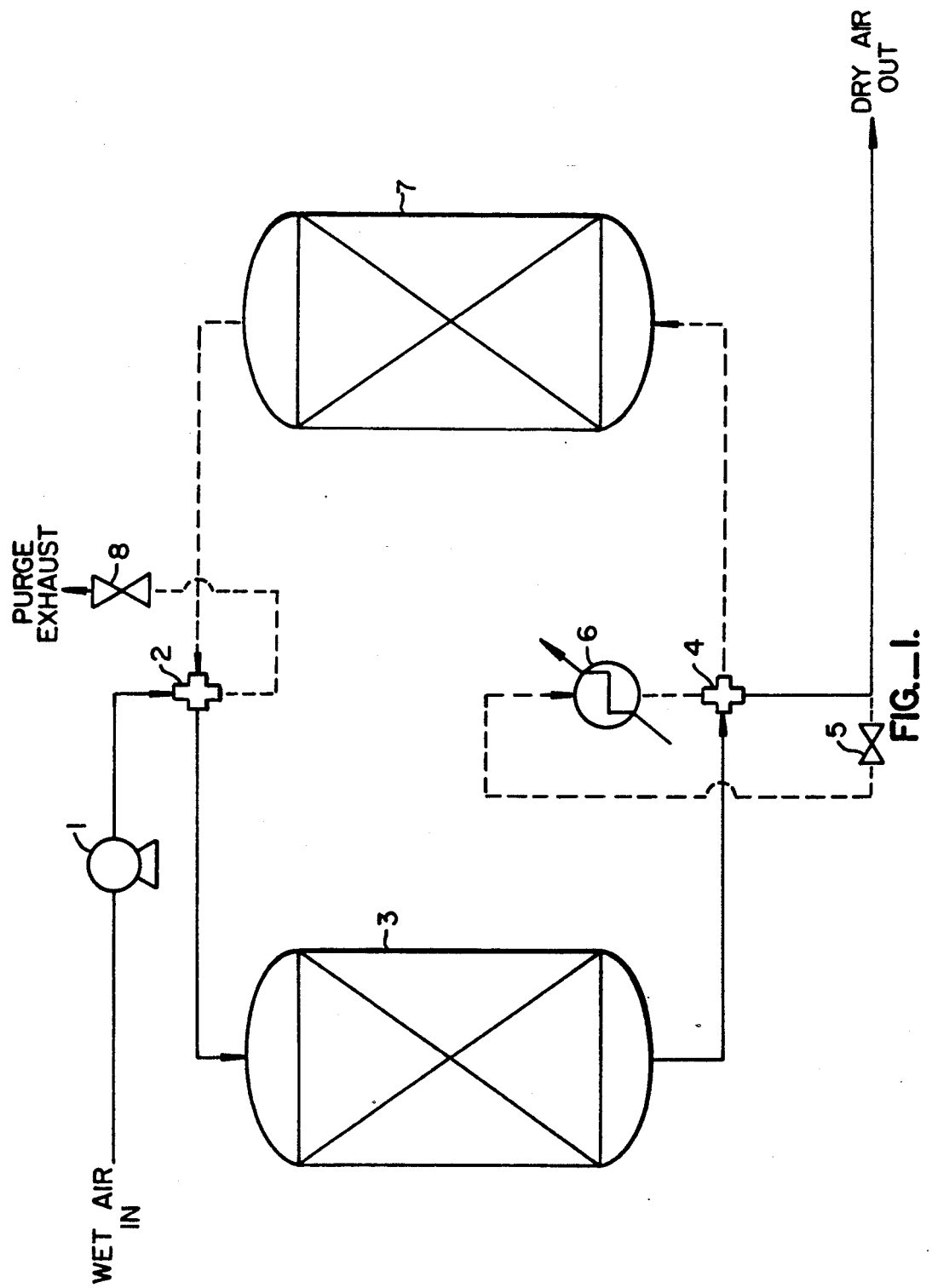

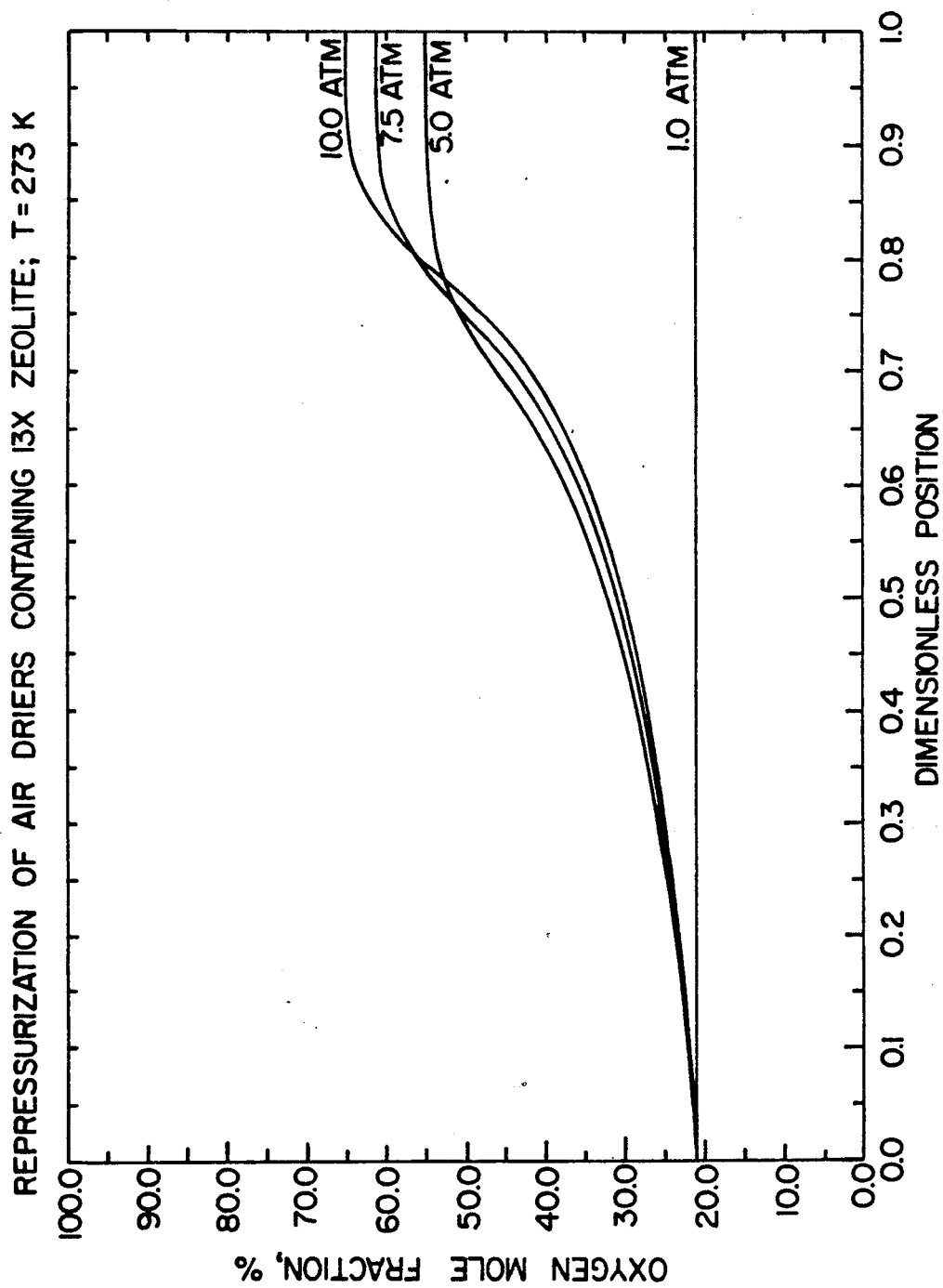

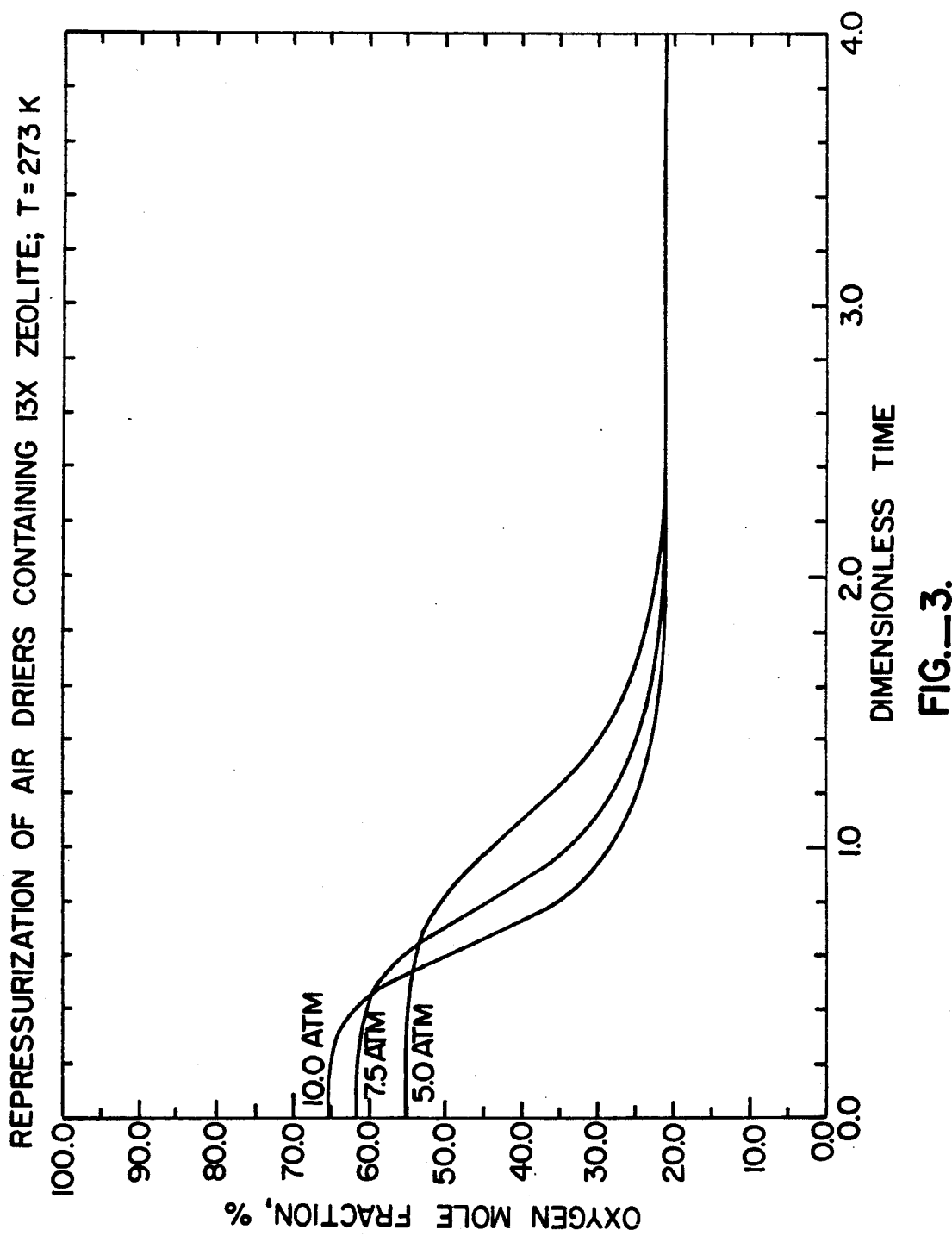
FIG._3.

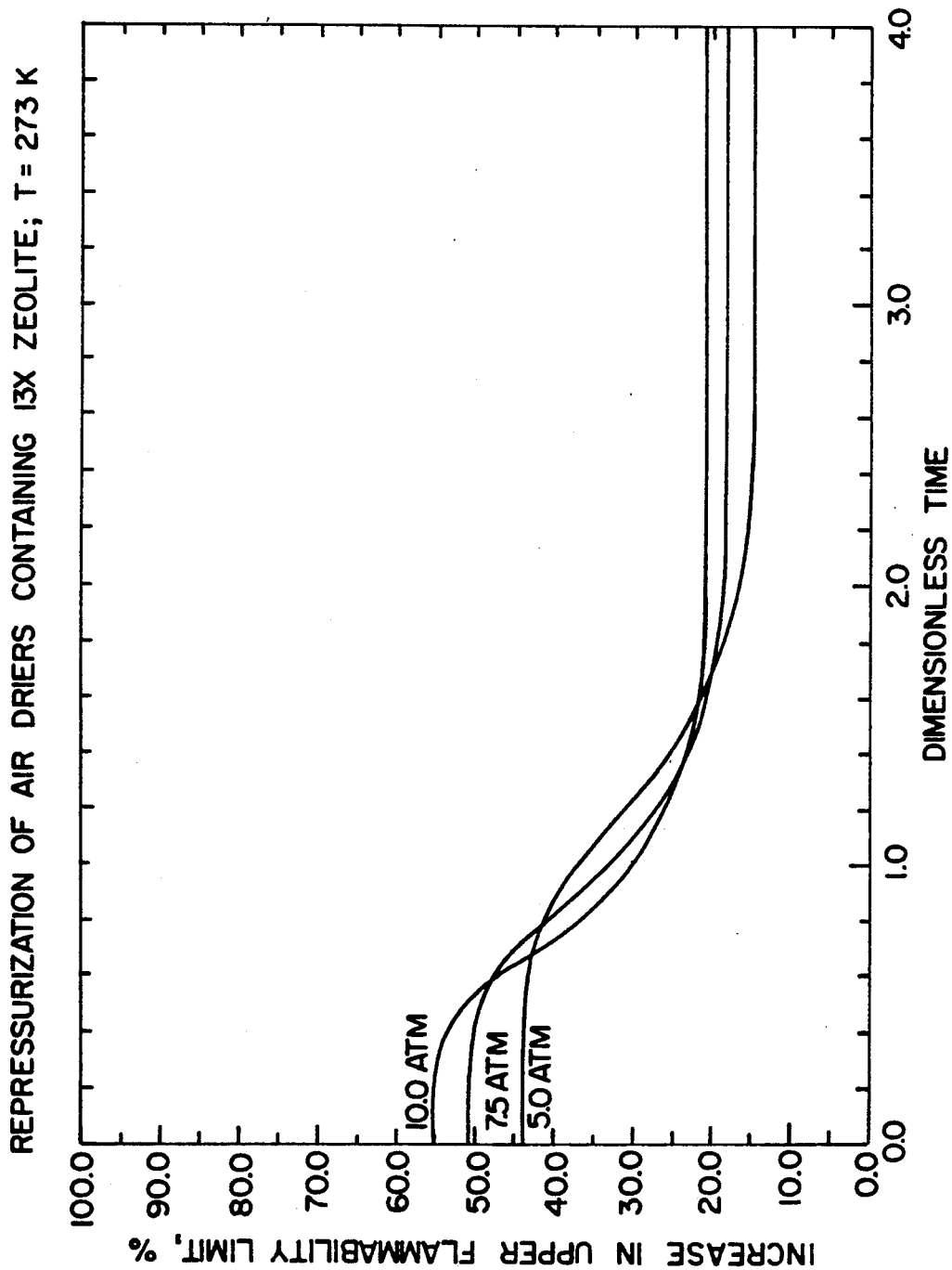
FIG._4.

APPARATUS AND METHOD FOR AIR DRYING WITH REDUCED OXYGEN ENRICHMENT

BACKGROUND OF THE INVENTION

Ambient air contains water vapor. Many industrial processes require a source of air with low water vapor content. Important reasons for the removal of water vapor from air are to control the humidity of manufacturing atmospheres, to protect electrical equipment against corrosion, short circuits, and electrostatic discharges, to meet requirements for chemical processes where moisture present in air adversely affects the process, and to prevent water adsorption in pneumatic conveying. Dried air is commonly produced at the point of use. Many types of air driers and air drying processes are used.

For many years, air driers have used adsorbent compositions, sometimes called desiccants or simply adsorbents, to remove water from air streams. For economic reasons, the adsorbent compositions used in air driers are usually used more than once. Adsorbent compositions suitable for use in air driers must be capable of adsorbing and desorbing water. Many different adsorbent compositions have been used in air drying. Adsorbent compositions used in air drying processes have contained certain types of molecular sieve zeolites, silica gels, and activated aluminas. Types 4A and 13X molecular sieve zeolites have been used in adsorbent compositions for air driers. Those molecular sieve zeolites have suitable water adsorbing and desorbing characteristics for use in air driers. These 4A or 13X molecular sieve zeolites are sometimes used in combination with other adsorbents to remove water and sometimes carbon dioxide and hydrocarbons from air streams.

Air driers are generally designed with at least two adsorbent chambers or vessels. This arrangement permits production of a continuous supply of dried air. Adsorbent chambers or vessels at least partially filled with adsorbents are sometimes called "adsorbers". Typically, one chamber having "dry" adsorbent is connected with the air stream and water vapor in the air is adsorbed. While that chamber is adsorbing water, the other chamber with "wet" adsorbent is isolated from the air stream and water is removed from the adsorbent. The air drying operation is sometimes called "adsorption" or simply "drying". The adsorbent drying operation is sometimes called "regeneration" or "reactivation". Air driers are designed to cycle between the chambers so that one operates in the drying mode, while another operates in the regeneration mode.

A variety of regeneration processes are used. A common method is called "thermal" or "heat" regeneration. Thermal regeneration involves heating the adsorbent composition to a temperature at which its adsorptive capacity is reduced. At the lower equilibrium adsorption capacity, the water leaves the adsorbent surface and is removed by a stream of "purge" gas or by vacuum. The temperature to which the adsorbent composition must be heated is determined primarily by the degree to which the air must be dried and the required rate of regeneration. Other factors being equal, the dew point produced by a thermally regenerated air drier using molecular sieve zeolite adsorbent compositions will be lower as the regeneration temperature increases from 250° F. to 600° F. Regeneration temperatures of 300° F. to 500° F. are usually employed. Thermal regeneration is commonly conducted at pressures below the pressures at which the air drying operation is conducted.

Air drying is conducted at the pressures of the air stream being dried. The air stream typically enters the adsorber for drying at pressures of 30 to several thousand pounds per square inch ("psig"), although some driers operate at pressures only marginally above atmospheric. The pressure in a chamber is typically reduced for thermal regeneration. Although the pressure is generally reduced for thermal regeneration, the external heat supplied to the adsorbent composition provides the primary thermodynamic driving force to regenerate the adsorbent composition in thermally regenerated air driers.

After an adsorbent composition has been thermally regenerated, a cooling period may be used to reduce the adsorbent temperature to nearly that of the stream being processed before the vessel is repressurized. Cooling is usually regulated so as to leave the adsorbent composition at a temperature within about 50° F. of the air stream to be dried. Subsequently, the pressure in the chamber is increased to the pressure of the air stream to be dried.

In sum, thermally regenerated adsorbent chambers or vessels typically operate in a cycle which includes the following steps: adsorb, depressure, heat adsorbent, cool adsorbent and repressure. The chambers of thermally regenerated air driers are generally sized to permit operation in the drying mode for periods of between about 1 to 24 hours and more typically between about 2 to 8 hours.

Certain molecular sieve zeolites are used to produce oxygen enriched air by a pressure-swing adsorption-desorption process, sometimes called "heatless" adsorption-desorption. This process operates by selective adsorption of nitrogen from air by molecular sieve zeolites at high pressure and desorption at lower pressure. Molecular sieve zeolites, such as type 5A, that exhibit a particularly strong selectivity for adsorbing nitrogen in preference to oxygen are used in this process.

This process is described generally in C. W. Skarstrom, U.S. Pat. No. 2,944,627. The adsorbent chambers of a heatless adsorption-desorption process are not regenerated by the use of external heat. A thermal regeneration step is not involved. Very short cycle times are used in heatless adsorption-desorption processes. The chambers of a heatless adsorption-desorption process are typically sized to permit operation in the adsorption mode for periods between about 10 seconds to 3 minutes.

BRIEF DESCRIPTION OF THE INVENTION

Fires and explosions sometimes occur after a thermally regenerated adsorbent chamber is brought on line. In one instance, a thermally regenerated air drier containing molecular sieve zeolite was placed between stages of an oil lubricated compressor. Detonation occurred at the compressor stage immediately downstream of the thermally regenerated air drier. After the compressor stage was rebuilt, another detonation occurred in the same stage.

It is common commercial practice to use an adsorbent composition containing substantial amounts of 4A or 13X molecular sieve zeolites in thermally regenerated air driers. When an adsorber of a thermally regenerated air drier using an adsorbent composition containing substantial amounts of 4A or 13X molecular sieve zeolites is repressed following thermal regeneration, oxygen-enriched air occupies the interstitial space in the adsorber and emerges from the adsorber when connected to the air stream to begin the adsorption step. Prior to this invention, it was not recognized that transient oxygen enrichment may occur in and be transported downstream of thermally regenerated air driers. Prior to this invention, it was not recognized such that transient oxygen enrichment contributes to the likelihood and the severity of fires and explosions, and to other undesirable effects, such as accelerated oxidation (e.g., rust in pipes, changes in biological specimens). Selective nitrogen adsorption and gas phase oxygen enrichment are heretofore unrecognized, unintended, and generally undesirable events in thermally regenerated air drying processes and driers, which contain substantial amounts of molecular sieve zeolites such as types 4A and 13X. The present invention prevents these effects in thermally regenerated air driers and processes.

The thermally regenerated air driers, adsorbent chambers, and air drying methods of the invention reduce this undesirable oxygen enrichment by using an adsorbent composition comprising one or more molecular sieve zeolites capable of adsorbing water vapor from air and being substantially free of molecular sieve zeolites capable of substantially selectively adsorbing nitrogen in preference to oxygen. One such adsorbent composition comprises type 3A molecular sieve zeolite and is substantially free of molecular sieve zeolites, such as types 4A and 13X, that substantially selectively adsorb nitrogen in preference to oxygen. In contrast to an adsorbent composition consisting essentially of one or more of the commonly used 4A and 13X molecular sieve zeolites, neither oxygen nor nitrogen adsorbs significantly on an adsorbent composition consisting essentially of 3A molecular sieve zeolite because the micropores of 3A molecular sieve zeolite are too small. The critical diameters of nitrogen and oxygen are about 3.6Å and 3.5Å respectively, both of which are larger than the 3.3Å diameter of the micropores of 3A molecular sieve zeolite (D. W. Breck, "Zeolite Molecular Sieves", Wiley, New York, 1974). Hence transient oxygen enrichment and its deleterious effects will not occur in and downstream of thermally regenerated adsorbers which contain such an adsorbent composition.

This invention relates to thermally regenerated air drying equipment. In general, this invention provides an apparatus for drying air comprising (a) at least one adsorbent chamber, (b) such chamber containing an adsorbent composition comprising one or more molecular sieve zeolites capable of adsorbing water vapor from air, wherein such composition is substantially free of molecular sieve zeolites capable of substantially selectively adsorbing nitrogen in preference to oxygen, (c) means for connecting an air stream to such chamber to adsorb water, (d) means for isolating such chamber from such air stream, and (e) means for reducing the air pressure in such isolated chamber, heating the adsorbent composition in such isolated chamber to substantially desorb water from such adsorbent composition, and increasing the air pressure in such chamber. The reducing, heating and increasing means (e) is also capable of substantially removing desorbed water from such chamber. Preferably, such an apparatus comprises at least two adsorbent chambers, each containing such an adsorbent composition, means for connecting an air stream to such chambers to adsorb water, means for isolating such chambers from the air stream to desorb water, and means for controlling such connecting and isolating means so that the air stream is connected to one such chamber to adsorb water while another such chamber is isolated from such air stream to desorb water. Such control means permits the apparatus to produce a continuous supply of dried air by alternating the air stream between such chambers so that one such chamber adsorbs water from the air while water is being desorbed from another such chamber. This apparatus permits thermally regenerated air drying without substantially increasing the oxygen concentration of the air in such isolated chamber as the air pressure in the chamber is increased after regeneration.

This invention also provides adsorbent chambers for use as components of thermally regenerated air driers. In general, this invention also provides an adsorbent chamber comprising (a) a chamber adapted for use as part of a thermally regenerated air drier, and (b) an adsorbent composition comprising one or more molecular sieve zeolites capable of adsorbing water vapor from air, wherein such composition is substantially free of molecular sieve zeolites capable of substantially selectively adsorbing nitrogen in preference to oxygen.

This invention also relates to thermally regenerated air drying processes for reducing the oxygen enrichment problem. In general, this invention provides a method of air drying comprising (a) adsorbing water vapor from an air stream by contacting such air stream with an adsorbent composition comprising one or more molecular sieve zeolites capable of adsorbing water vapor from air, wherein such composition is substantially free of molecular sieve zeolites capable of substantially selectively adsorbing nitrogen in preference to oxygen, and isolating such adsorbent composition from such air stream, (b) reducing the pressure of the air in contact with such adsorbent composition, (c) heating such adsorbent composition to desorb water, and (d) increasing the pressure of air in contact with such adsorbent composition. This process also involves substantially removing desorbed water from contact with the adsorbent composition.

The apparatus, adsorbent chambers and methods of the invention may use any adsorbent composition containing one or more molecular sieve zeolites to adsorb water vapor from air and being substantially free of molecular sieve zeolites capable of substantially selectively adsorbing nitrogen in preference to oxygen.

DESCRIPTION OF THE INVENTION

The Figures And Table

FIG. 1 shows a typical thermally regenerated air drier.

FIG. 2 illustrates predicted axial composition profiles after repressurization of a thermally regenerated adsorber containing 13X molecular sieve zeolite. The adsorber was assumed to contain freshly regenerated 13X molecular sieve zeolite and air at the start of an isothermal repressurization step. Air at 273° K. was assumed to enter the adsorber during the isothermal repressurization step until the total pressure in the adsorber reached 5.0, 7.5, or 10.0 atm.

FIG. 3 illustrates predicted composition breakthrough curves for an adsorption step of a thermally regenerated adsorber containing 13X molecular sieve zeolite. Air at 273° K. is assumed to enter the adsorber during an isothermal adsorption step, which immediately follows the corresponding isothermal repressurization step shown in FIG. 2. The dimensionless time equals the number of bed volumes which are assumed to pass through the adsorber, based on an empty vessel.

FIG. 4 illustrates a predicted increase in the upper flammability limit of a hydrocarbon fuel relative to air in the effluent gas emerging from a thermally regenerated adsorber containing 13X molecular sieve zeolite. The dimensionless time equals the number of bed volumes which are assumed to have passed through the adsorber, based on an empty vessel.

Table 1 lists the minimum autoignition temperatures of certain hydrocarbon fuels in degrees Kelvin.

DESCRIPTION

This invention relates to thermally regenerated air drying equipment, adsorbent chambers for such air driers, and air drying processes.

FIG. 1 illustrates one type of thermally regenerated air drier and air drying process that may employ this invention. The ambient air stream to be dried is pressurized by a compressor, 1, enters an inlet switching valve, 2, passes through the left adsorbent chamber to adsorb water vapor, 3, through an outlet switching valve, 4, to the dry air outlet. During this adsorption or drying step, the air pressure is typically about 30 to several thousand psig. The temperature of the air stream is typically about 40° F. to 130° F. The flow rate may vary over a wide range depending on drying requirements. A portion of dried air passes through a purge throttling valve, 5, then passes through a heater, 6, and the outlet switching valve, 4. Heated purge gas then enters the right adsorbent chamber, 7, where it is dispersed through the wet adsorbent composition. Flow direction may be co-current or counter-current to the drying flow. The pressure in the adsorbent chamber during this regeneration or reactivation step is typically about 0.1 to 100 psig. The purge air, now carrying previously adsorbed moisture, exits to the atmosphere through the inlet switching valve, 2, and the purge exhaust valve, 8. The regenerating adsorbent chamber is also typically cooled to temperatures of about 40° F. to 150° F., for example, by turning off or bypassing the heater, 6, prior to the adsorption step. At the end of the regeneration period, the purge exhaust valve, 8, may close to repressurize the reactivated adsorbent chamber, 7. Switchover may then take place with both chambers at line pressure. Alternatively, the reactivated adsorbent chamber may be repressurized as the chamber is switched to connect it to the air stream for air drying. The inlet and outlet switching valves reverse the air flows. The switching valves and purge exhaust valve may be controlled manually or by conventional controllers adjusted to the requirements of the particular drier and process. Upon switchover, the left wet adsorbent chamber, 3, is depressurized, and its regeneration cycle initiated, while the regenerated right chamber, 7, dries air at line pressure.

This is one example of a thermally regenerated air drier and air drying process that may employ the invention. It will be apparent to those skilled in the art that there are other types of thermally regenerated air driers and air drying processes that may employ the invention. A commercial thermally regenerated air drier that is designed and operates in a manner capable of use in the invention is the Pall Trinity Micro Corporation's Type A Heat-Reactivated Dryer.

When an adsorber of such a thermally regenerated air drier using an adsorbent composition containing substantially 4A or 13X molecular sieve zeolites is repressurized following thermal regeneration, oxygen-enriched air emerges from the adsorber during the beginning of the adsorption step. Transient oxygen enrichment increases the likelihood and the severity of fires and explosions in and downstream of thermally regenerated air driers that use an adsorbent composition capable of substantially selectively adsorbing nitrogen in preference to oxygen, such as a composition containing substantially types 4A and 13X molecular sieve zeolites.

A combination of fuel, oxidizer, and a source of ignition must be present to support combustion. Hydrocarbons and ignition sources are commonly found in and downstream of thermally regenerated air driers. Compressors, pipelines with an oil film on the inside walls, and coke deposits on adsorbent compositions are potential sources of hydrocarbons and ignition. Compressors which sometime follow thermally regenerated air driers provide both necessary conditions for combustion. For example, autoignition and detonation of compressor lubricating oils due to an increased oxygen concentration in the compressor inlet gases have been reported in equipment used to produce oxygen and nitrogen from air, commonly known as air separation facilities. Pipelines coated with oil on their interior and charged with air present a severe explosion hazard. Intermittent flow, especially a sudden start of air flow, facilitates the ignition of oil residues by depressing the autoignition temperature to 425° K. The sudden start of flow when an adsorber is brought on line will coincide with the highest oxygen partial pressure of the adsorber effluent. Fires have been reported to occur in pipelines downstream of thermally regenerated air driers. However, prior to this invention, no one explained these incidents on the basis of transient oxygen enrichment or disclosed how to reduce oxygen enrichment by the choice of adsorbent composition.

The thermally regenerated air driers, adsorbent chambers, and air drying methods of the invention reduce this undesirable oxygen enrichment by using an adsorbent composition containing molecular sieve zeolites to adsorb water vapor while being substantially free of molecular sieve zeolites that substantially selectively adsorb nitrogen in preference to oxygen. One such preferred adsorbent composition consists essentially of type 3A molecular sieve zeolite. In contrast to an adsorbent composition containing substantial amounts of one or more of the commonly used 4A and 13X molecular sieve zeolites, neither oxygen nor nitrogen adsorbs significantly on an adsorbent composition consisting essentially of 3A molecular sieve zeolite. Hence transient oxygen enrichment and its deleterious effects can not occur in and downstream of thermally regenerated adsorbers which contain an adsorbent composition that does not substantially selectively adsorb nitrogen in preference to oxygen.

This invention provides an apparatus for drying air comprising (a) at least one adsorbent chamber, (b) such chamber containing an adsorbent composition comprising one or more molecular sieve zeolites capable of adsorbing water vapor from air, wherein such composition is substantially free of molecular sieve zeolites capable of substantially selectively adsorbing nitrogen in preference to oxygen, (c) means for connecting an air stream to such chamber to adsorb water, (d) means for isolating such chamber from such air stream, and (e)

means for reducing the air pressure in such isolated chamber, heating the adsorbent composition in such isolated chamber to substantially desorb water from such adsorbent composition, and increasing the air pressure in such isolated chamber. Such reducing, heating and increasing means (e) also is adapted for substantially removing desorbed water from such chamber. Preferably, such an apparatus comprises at least two adsorbent chambers, each containing such an adsorbent composition, means for connecting an air stream to such chambers to adsorb water, means for isolating such chambers from the air stream to desorb water and means for controlling such connecting and isolating means so that the air stream is connected to one such chamber to adsorb water while another such chamber is isolated from such air stream to desorb water. Such control means permits the apparatus to produce a continuous supply of dried air by alternating the air stream between such chambers so that one such chamber adsorbs water from the air while water is being desorbed from another such chamber. This apparatus permits thermally regenerated air drying, without substantially increasing the oxygen concentration of the air in such isolated chamber as the air pressure in the chamber is increased after regeneration.

This invention also provides an adsorbent chamber comprising (a) a chamber adapted for use as part of a thermally regenerated air drier, and (b) an adsorbent composition comprising one or more molecular sieve zeolites capable of adsorbing water vapor from air, wherein such composition is substantially free of molecular sieve zeolites capable of substantially selectively adsorbing nitrogen in preference to oxygen.

This invention provides a method of air drying comprising (a) adsorbing water vapor from an air stream by contacting such air stream with an adsorbent composition comprising one or more molecular sieve zeolites capable of adsorbing water vapor from air, wherein such composition is substantially free of molecular sieve zeolites capable of substantially selectively adsorbing nitrogen in preference to oxygen, and isolating such adsorbent composition from such air stream, (b) reducing the pressure of the air in contact with such adsorbent composition, (c) heating such adsorbent composition to desorb water, and (d) increasing the pressure of air in contact with such adsorbent composition.

The apparatus, adsorbent chambers and methods of the invention may use any adsorbent composition containing one or more molecular sieve zeolites capable of adsorbing water vapor and being substantially free of molecular sieve zeolites capable of substantially selectively adsorbing nitrogen in preference to oxygen. An adsorbent composition is substantially free of molecular sieve zeolites capable of substantially selectively adsorbing nitrogen in preference to oxygen, if such composition does not cause substantial transient oxygen enrichment of the air in an adsorbent chamber resulting from thermal regeneration and repressurization. A suitable adsorbent composition may contain one particular type of molecular sieve zeolite adsorbent or may consist of a mixture of different types. Such adsorbent compositions may contain insubstantial amounts of types of adsorbents that do substantially selectively adsorb nitrogen in preference to oxygen, such as activated alumina or certain silica gels, and, less preferably, such as types 4A and 13X molecular sieve zeolites. An insubstantial amount of such adsorbent is an amount that is too small to cause any significant oxygen enrichment.

Adsorbent compositions may be used in the forms in which they are normally used in thermally regenerated air drying applications. Adsorbent compositions may contain adsorbents and binders for adsorbents suitable for use in thermal regenerated air drying. Molecular sieve zeolite powders may be blended in the usual manner with inorganic binders and formed into larger agglomerates of discrete size and shape suitable for use in thermally regenerated air driers. The particle size of the zeolite crystals and the size of agglomerates may be those conventionally used.

The adsorbent compositions for use in the invention contain one or more natural or synthetic molecular sieve zeolites capable of adsorbing water vapor from air without substantially selectively adsorbing nitrogen in preference to oxygen. Molecular sieve zeolites are described in Breck, D. W. and Smith, J. V. "Molecular Sieves", Scientific American, 6 (January, 1959) and Breck, D. W. "Zeolite Molecular Sieves" (Wiley 1974). Molecular sieve zeolites can selectively adsorb molecules based on differences in the size, shape, and other properties, such as polarity, of molecules. Selective adsorption may be accomplished by selecting molecular sieve zeolites for use in the composition based on their effective pore diameter or based on their preferential affinity for adsorption of one molecular species over another.

Molecular sieve zeolites are crystalline aluminosilicates of group IA and group IIA elements such as sodium, potassium, magnesium, and calcium. Structurally, zeolites are complex, crystalline inorganic polymers based on an infinitely extending framework of $AlO_4$ and $SiO_4$ tetrahedra linked to each other by the sharing of oxygen ions. Other molecular sieve zeolites use phosphorous ions in place of some aluminum ions. This framework structure contains channels or interconnected voids that may be occupied by the cations and water molecules. The water may be removed reversibly, which leaves intact a crystalline host structure permeated by micropores. The micropores of a particular type of zeolite have a uniform pore size. The basic framework structure, or topology, of the zeolite determines the pore size and the void volume. The exchange cations, in terms of their specific location in the structure, their population or density, their charge and size, affect the molecular sieve zeolite behavior and adsorption selectivity of the zeolite. By changing the cation types and number, one can tailor or modify within certain limits the selectivity of the zeolite. Molecular sieve zeolites adsorb selectively based on the size and shape differences between the crystal apertures and the adsorbate molecule. The adsorption selectivity of a zeolite may also be based upon differences in the relative adsorption affinity between or among two or more coadsorbed gases or vapors. It is possible to tailor the zeolite adsorption characteristics in terms of size selectivity or the selectivity caused by other interactions, including: cation exchange; cation removal or decationization; the presorption of a very strongly held polar molecule, such as water; pore-closure effects, that is, effects which alter the size of the openings to the crystal; and the introduction of various defects such as removal of framework aluminum and changes in the silicon/aluminum ratio.

The basic types of commercially used molecular sieve zeolite adsorbents are the 3A, 4A, 5A, and 13X sieves. The parent molecular sieve zeolite of the Type A group is the 4A, which has sodium cations partially blocking the pores so that the effective pore opening is approximately 4Å. Type 4A will adsorb molecules with critical diameters of less than 0.4 nm. The type 3A sieve is a modification of the 4A in which most of the blocking sodium cations have been replaced by potassium. The potassium ion, being larger, blocks a greater portion of the pore opening and reduces its effective size. The 5A sieve is a modified 4A in which the blocking sodium cations have been replaced by calcium. Since each calcium ion replaces two sodium ions, the number of cations is reduced. This causes most of the pore openings to be essentially unblocked and the resulting effective pore opening is nearly 5Å. The corresponding parent molecular sieve zeolite of the type X is also the sodium form. The crystal structure of type 13X results in an effective pore opening of approximately 10Å diameter. In their current commercial form, types 4A, 5A, and 13X are not suitable for use in substantial amounts in adsorbent compositions of the invention.

A particularly preferred adsorbent composition consists essentially of type 3A molecular sieve zeolite. Type 3A molecular sieve zeolite adsorbs essentially no oxygen or nitrogen. Thus no substantial oxygen enrichment can occur in thermally regenerated air driers which contain an adsorbent composition consisting of essentially type 3A molecular sieve zeolite.

Other adsorbents for use in the thermally regenerated air driers as part of an adsorbent composition also containing suitable molecular sieve zeolites are activated aluminas and silica gels. Activated aluminas and silica gels have disadvantages relative to molecular sieve zeolites such as type 3A. Activated aluminas and silica gels readily adsorb hydrocarbons, some of which react to form coke deposits which act as a fuel and as an adsorbent. Compressor lubricants are a common source of hydrocarbons. Varying amounts of hydrocarbons present in ambient air are another problem. Because only low molecular weight hydrocarbons desorb during the reactivation steps, activated aluminas and silica gels can accumulate sufficient hydrocarbons or coke deposits to cover nearly 100% of their surface area. The resulting hydrocarbon film or coke layer of several hundred square meters per gram of adsorbent is an abundant quantity of accessible fuel. In comparison, hydrocarbons can enter only the macropores in the clay binder of 3A molecular sieve zeolite. All hydrocarbons are too large to penetrate the 3 Angstrom apertures to the interior cavities. The macropores of the clay binder of a typical 3A molecular sieve zeolite bead or pellet comprise only about 1% of the total surface area of type 3A molecular sieve zeolite, amounting to generally less than about 5 square meters per gram of adsorbent. Thus use of 3A molecular sieve zeolite effectively minimizes hydrocarbon and coke deposits as a fuel. Coke deposits covering a significant fraction of the surface area of the myriad pores of activated aluminas and silica gels may also become an important secondary adsorbent. Specifically, coke deposits in activated aluminas and silica gels may behave like activated carbons which adsorb oxygen, sometimes preferentially relative to nitrogen. Oxygen adsorbed on carbon has long been known to present a grave risk of fire and explosion, even at liquid air temperatures. Fire and explosion hazards involving coke deposits which adsorb oxygen preferentially relative to nitrogen could be severe, primarily because large quantities of molecular oxygen intimately contact the coke. For those coke deposits which absorb nitrogen preferentially relative to oxygen, the oxygen-enriched gas will present fire and explosion hazards downstream of the adsorber as well. For these reasons, it is not preferred to employ activated aluminas or silica gels in the adsorbent composition of the invention.

The physical form of adsorbent composition, the quantity of adsorbent composition, and the other variables that determine the operation and efficiency of thermally regenerated air drying apparatus, chambers and processes of the invention, such as vessel size and configuration, cycle time, pressure, temperature and regeneration requirements, flow directions, may be determined in the conventional way.

A Model To Illustrate The Problem

An isothermal equilibrium model was adapted to illustrate the performance of thermally regenerated air driers which contain 13X molecular sieve zeolite. The nature of the oxygen enrichment problem is illustrated by predicting the nitrogen/oxygen breakthrough curves for thermally regenerated adsorbers which contain 13X molecular sieve zeolite. This illustrates how nitrogen may adsorb preferentially relative to oxygen in 13X molecular sieve zeolite during the repressurization step, and that oxygen enriched effluent at high pressure may emerge when the thermally regenerated adsorbers are brought on line. This model illustrates the manner in which transient oxygen enrichment may occur in prior thermally regenerated air driers and processes. The actual operation of prior thermally regenerated air driers and processes may deviate somewhat from the model for a variety of reasons.

FIG. 2 shows the predicted axial composition profiles at the end of a repressurization step for thermally regenerated adsorbers containing freshly regenerated 13X molecular sieve zeolite. In all cases the adsorbers were assumed to contain freshly regenerated molecular sieve zeolite and air at 1 atm at the start of the repressurization step. Air was assumed to enter the adsorber during the isothermal repressurization step until the total pressure reached 5.0, 7.5, or 10.0 atm. The figure exhibits an oxygen mole fraction of roughly 60 percent at the closed (effluent) end of the adsorber.

FIG. 3 shows the predicted breakthrough curves that emerge from the thermally regenerated adsorbers during the subsequent adsorption step. The dimensionless time on the horizontal axis equals the number of bed volumes of air that are assumed to have passed through the adsorber, based on an empty vessel. FIG. 3 indicates that the effluent composition returns to that of the air feed after approximately two bed volumes of air have passed through the adsorber.

The presence of a high gaseous oxygen concentration widens the flammability range of hydrocarbons, markedly lowers the minimum autoignition temperature of hydrocarbons, and produces a much higher explosion pressure and rate of explosion pressure rise compared with air at standard temperature and pressure ("STP"). In a gaseous mixture at a given temperature, the partial pressure of oxygen rises with either an increase in the oxygen mole fraction or an increase in the total pressure. Both of these mechanisms operate during the repressurization of thermally regenerated air driers which contain substantially 4A or 13X molecular sieve zeolites. Increasing the oxygen mole fraction above the 21% level found in air greatly expands the flammability range. Fires and explosions can be prevented by operating outside of the flammability range. The lower flammability limit of hydrocarbons in air at STP is generally in the range of 1 to 5 mole percent, and it remains nearly independent of oxygen composition because it is fuel-limited. The upper flammability limit of hydrocarbons in air at STP varies from roughly 10 to 20 mole percent. As the oxygen mole fraction increases above the 21% level of air, the upper flammability limit of hydrocarbons increases. In the following equation, $U_c$ is the upper flammability limit of hydrocarbon in mole percent due to oxygen composition increase, and Y is the mole fraction of oxygen.

$$\Delta U_c \approx 70.0[\log(Y)+0.679]$$

Elevated pressures also widen the flammability range. While the lower flammability limit of hydrocarbons decreases very slightly with increasing pressure, the upper flammability limit of hydrocarbons due to total pressure increases, $U_p$, increases in proportion to the logarithm of the total pressure, P.

$$\Delta U_p \approx 20.6[\log(P)-5.0]$$

The pressure and composition effects can be added together to find the total effect on the upper flammability limit of hydrocarbons.

FIG. 4 illustrates the increase in the upper flammability limit of hydrocarbons as oxygen enriched effluent emerges from a thermally regenerated adsorber containing 13X molecular sieve zeolite. The dimensionless time of zero corresponds to the instant the adsorber vessel is brought on line. Here both the composition and total pressure effects lead to an increase in the upper flammability limit of approximately 50 percent. At a dimensionless time of 4, oxygen-enriched effluent no longer emerges from the adsorber. Then the upper flammability limit increases by 15 to 20 percent because of the pressure contribution only.

Increases in both the total pressure and the oxygen mole fraction decrease the minimum autoignition temperature of hydrocarbons relative to air at STP. The minimum autoignition temperature is a measure of the thermal energy required to initiate combustion; specifically, it is the lowest temperature at which the fuel spontaneously ignites. Table 1 indicates that the minimum autoignition temperatures of kerosene and mineral oils fall to roughly 500 K. at a total air pressure of 10 atm.

The presence of iron oxides in rust catalyzes the oxidation of oil and coke deposits, and lowers the minimum autoignition temperature of oils by roughly 50 K. Other metal oxides may also promote oxidation and lower the minimum autoignition temperature of hydrocarbons.

Increasing the total pressure and oxygen mole fraction above that of air at 1 atm leads to a higher ultimate explosion pressure. The pressure contribution follows from the ideal gas law, where the final pressure in a closed system increases in proportion to the initial pressure, the ratio of final to initial moles of gas, and the ratio of final to initial temperatures.

$$P_2 = \frac{P_1 n_2 T_2}{n_1 T_1}$$

An increase in the oxygen mole fraction will raise the ultimate explosion pressure if it allows more fuel to react. Combustion of a volatile liquid increases the ultimate explosion pressure relative to a flammable gas since combustion of a volatile liquid produces a larger change in the ratio of moles of gas.

Additionally, increasing the total pressure and oxygen mole fraction above that of air at 1 atm can produce a higher combustion rate, which forces the explosion pressure to rise more rapidly and increases the severity of an explosion. Although combustion kinetics can be very complex, the rate of reaction or combustion typically accelerates with increasing fuel and oxygen partial pressures.

This model illustrates the nature of the problem solved by the invention.

TABLE 1

| Pressure (atm) | Minimum Autoignition Temperatures of Hydrocarbon Fuels in Degrees Kelvin | | |
|---|---|---|---|
| | Type of Hydrocarbon Fuel | | |
| | Kerosene (a) | Mineral Oils (b) | Mineral Oils (c) |
| 0.25 | 866 | | |
| 0.50 | 737 | | |
| 1.0 | 502 | 623 | 568 |
| 10.0 | | 523 | 535 |
| 100.0 | | 473 | 502 |

Notes:
a. J.M. Kuchta, S. Lambiris, and M.G. Zabetakis, "Flammability and Autoignition of Hydrocarbon Fuels under Static and Dynamic Conditions", U.S. Bur. Mines Rep. Invest. 5992, 1962.
b. M.G. Zabetakis, G.S. Scott, and R.E. Kennedy, "Autoignition of Lubricants at Elevated Pressures", U.S. Bur. Mines Rep. Invest. 6112, 1962.
c. C.S. McCoy and F.J. Hanly, "Fire-Resistant Lubricants for Refinery Air Compressors", paper presented at the National Fuels and Lubricants Meeting of the National Petroleum Refiners Association, September 11-12, 1975, Houston, Tx.
d. Normal hexane and longer normal paraffins have autoignition temperatures of 480 to 500 K in air at STP (F.T. Bodurtha, "Industrial Explosion Prevention and Protection", McGraw-Hill, New York, 1980).

What is claimed is:
1. A method of air drying comprising:
(a) adsorbing water vapor from an air stream by contacting such air stream with an adsorbent composition comprising one or more molecular sieve zeolites capable of adsorbing water vapor from air, wherein such composition is substantially free of molecular sieve zeolites capable of substantially selectively adsorbing nitrogen in preference to oxygen, and isolating such adsorbent composition from such air stream,
(b) reducing the pressure of the air in contact with such adsorbent composition,
(c) heating such adsorbent composition to desorb water, and
(d) increasing the pressure of air in contact with such adsorbent composition.

2. The method of claim 1, wherein such one or more molecular sieve zeolites capable of adsorbing water vapor from air is type 3A molecular sieve zeolite.

3. The method of claim 1, wherein such one or more molecular sieve zeolite capable of adsorbing water vapor from air is type 3A molecular sieve zeolite, and such molecular sieve zeolites capable of substantially selectively adsorbing nitrogen in preference to oxygen are types 4A and 13X molecular sieve zeolites.

4. The method of claim 1, wherein such adsorbent composition comprises one or more molecular sieve zeolites capable of adsorbing water vapor from air and one or more activated aluminas or silica gels capable of adsorbing water vapor in amounts and types so that such composition is not capable of substantially selectively adsorbing nitrogen in preference to oxygen, and wherein such composition is substantially free of molecular sieve zeolites capable of substantially selectively adsorbing nitrogen in preference to oxygen.

5. The method of claim 4, wherein such one or more molecular sieve zeolites capable of adsorbing water vapor from air is type 3A molecular sieve zeolite.

6. An apparatus for drying air comprising:
   (a) at least one adsorbent chamber containing an adsorbent composition comprising one or more molecular sieve zeolites capable of adsorbing water vapor from air, wherein such composition is substantially free of molecular sieve zeolites capable of substantially selectively adsorbing nitrogen in preference to oxygen,
   (b) means for providing an air stream and connecting such air stream to such chamber to adsorb water,
   (c) means for isolating such chamber from such air stream, and
   (d) means for reducing the air pressure in such isolated chamber, heating such adsorbent composition to substantially desorb water from such adsorbent composition, and increasing the air pressure in such isolated chamber.

7. An apparatus for drying air comprising:
   (a) at least two adsorbent chambers containing an adsorbent composition comprising one or more molecular sieve zeolites capable of adsorbing water vapor from air, wherein such composition is substantially free of molecular sieve zeolites capable of substantially selectively adsorbing nitrogen in preference to oxygen,
   (b) means for providing an air stream and connecting such air stream to such chamber to adsorb water,
   (c) means for isolating such chamber from such air stream,
   (d) means for controlling such connecting and isolating means so that the air stream is directed through one such chamber to adsorb water while another such chamber is isolated from such air stream to desorb water, and
   (e) means for reducing the air pressure in such isolated chamber, heating such adsorbent composition to substantially desorb water from such adsorbent composition, and increasing the air pressure in such isolated chamber.

8. An apparatus of claim 6 or 7, wherein such one or more molecular sieve zeolites capable of adsorbing water vapor from air is type 3A molecular sieve zeolite.

9. An apparatus of claim 6 or 7, wherein such one or more molecular sieve zeolites capable of adsorbing water vapor from air is type 3A molecular sieve zeolite, and such molecular sieve zeolites capable of substantially selectively adsorbing nitrogen in preference to oxygen are types 4A and 13X molecular sieve zeolites.

10. An apparatus of claim 6 or 7, wherein such adsorbent composition comprises one or more molecular sieve zeolites capable of adsorbing water vapor from air and one or more activated aluminas or silica gels capable of adsorbing water vapor from air in amounts and types so that such composition is not capable of substantially selectively adsorbing nitrogen in preference to oxygen, and wherein such composition is substantially free of molecular sieve zeolites capable of substantially selectively adsorbing nitrogen in preference to oxygen.

11. An apparatus of claim 10 wherein such one or more molecular sieve zeolites capable of adsorbing water vapor from air is type 3A molecular sieve zeolite.

* * * * *